(12) United States Patent
Colegrove et al.

(10) Patent No.: US 8,882,127 B2
(45) Date of Patent: Nov. 11, 2014

(54) BICYCLE REAR WHEEL SUSPENSION SYSTEM

(75) Inventors: James Colegrove, Lake Mills, WI (US); Dylan Howes, Monona, WI (US); Jose Gonzalez, Santa Clarita (ES); Michael Hammond, Monona, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 13/550,721

(22) Filed: Jul. 17, 2012

(65) Prior Publication Data

US 2012/0280470 A1     Nov. 8, 2012

Related U.S. Application Data

(60) Continuation of application No. 12/901,893, filed on Oct. 11, 2010, now Pat. No. 8,235,409, which is a continuation of application No. 11/735,816, filed on Apr. 16, 2007, now Pat. No. 7,837,213, application No. 13/550,721, which is a continuation of application No. 12/719,114, filed on Mar. 8, 2010, now abandoned, which is a division of application No. 11/839,931, filed on Aug. 16, 2007, now Pat. No. 7,703,785.

(51) Int. Cl.
*B62K 25/28*     (2006.01)

(52) U.S. Cl.
CPC .................................. *B62K 25/286* (2013.01)
USPC ........................................................ 280/284

(58) Field of Classification Search
USPC .................................. 280/283, 284, 285, 288
See application file for complete search history.

(56) References Cited

U.S. PATENT DOCUMENTS

| | | | |
|---|---|---|---|
| 423,471 A | 3/1890 | Easthope |
| 439,095 A | 10/1890 | Becker |
| 443,266 A | 12/1890 | Bell et al. |
| 444,639 A | 1/1891 | O'Neill et al. |
| 470,317 A | 3/1892 | Burton |

(Continued)

FOREIGN PATENT DOCUMENTS

| | | |
|---|---|---|
| CA | 2536 779 A1 | 7/2005 |
| CA | 2537049 A1 | 7/2005 |

(Continued)

OTHER PUBLICATIONS

Translation of DE 20217875U1.

(Continued)

*Primary Examiner* — Tony H. Winner
*Assistant Examiner* — Wesley Potter
(74) *Attorney, Agent, or Firm* — Boyle Fredrickson, S.C.

(57) ABSTRACT

A bicycle frame assembly having a number of rotatable members configured to absorb shocks and impacts associated with operation of the bicycle. The assembly includes a frame constructed to support a rider and a chain stay having a rearward end that extends toward a wheel hub and a forward end that is pivotably connected to the frame. An absorber is pivotably connected to the forward end of the chain stay and extends to a rocker arm that is pivotably connected to the frame. A seat stay is pivotably connected to a rearward end of the rocker arm and extends to the rearward end of the chain stay. The rearward ends of the seat stay and the chain stay are pivotably connected to rotate about a common axis.

25 Claims, 6 Drawing Sheets

(56) References Cited

U.S. PATENT DOCUMENTS

| | | | |
|---|---|---|---|
| 625,456 A | 5/1899 | Mills et al. | |
| 695,955 A | 3/1902 | Smith | |
| 739,237 A | 9/1903 | Travis | |
| 902,920 A | 11/1908 | Silva | |
| 1,016,042 A | 1/1912 | Shelton et al. | |
| 1,039,684 A | 10/1912 | Anzi | |
| 1,043,269 A | 11/1912 | Stehpenson | |
| 1,047,430 A | 12/1912 | Michaelson | |
| 1,075,886 A | 10/1913 | White | |
| 1,147,415 A | 7/1915 | McLeod | |
| 1,298,958 A | 4/1919 | Johnston | |
| 1,412,012 A | 4/1922 | Bruno | |
| 2,283,671 A | 5/1942 | Finlay et al. | |
| 3,226,674 A | 12/1965 | Eriksson | |
| 4,184,695 A | 1/1980 | Roe et al. | |
| 4,260,657 A | 4/1981 | Loyd et al. | |
| 4,322,088 A * | 3/1982 | Miyakoshi et al. | 280/284 |
| 4,457,393 A * | 7/1984 | Tamaki et al. | 180/227 |
| 4,497,506 A | 2/1985 | Miyakoshi et al. | |
| 4,561,519 A | 12/1985 | Omori | |
| 4,582,343 A | 4/1986 | Waugh | |
| 4,682,675 A | 7/1987 | Eddy, Jr. | |
| 4,753,314 A | 6/1988 | Tsukiji | |
| 4,775,163 A | 10/1988 | McGowan et al. | |
| 4,789,174 A | 12/1988 | Lawwill | |
| 4,807,898 A | 2/1989 | Huntly | |
| 4,997,197 A | 3/1991 | Shultz | |
| 5,121,937 A | 6/1992 | Lawwill | |
| 5,215,322 A | 6/1993 | Enders | |
| 5,217,241 A | 6/1993 | Girvin | |
| 5,226,674 A | 7/1993 | Buell et al. | |
| 5,244,224 A | 9/1993 | Busby | |
| 5,271,879 A | 12/1993 | Seatchi et al. | |
| 5,306,036 A | 4/1994 | Busby | |
| 5,409,248 A | 4/1995 | Williams | |
| 5,431,426 A | 7/1995 | Ijams et al. | |
| 5,441,292 A | 8/1995 | Busby | |
| 5,452,910 A | 9/1995 | Harris | |
| 5,474,318 A | 12/1995 | Castellano | |
| 5,498,211 A | 3/1996 | Hsu | |
| 5,509,679 A | 4/1996 | Leitner | |
| 5,553,881 A | 9/1996 | Klassen et al. | |
| 5,586,780 A | 12/1996 | Klein et al. | |
| 5,592,999 A | 1/1997 | Matsuura et al. | |
| 5,611,557 A | 3/1997 | Farris et al. | |
| 5,624,519 A | 4/1997 | Nelson et al. | |
| 5,628,524 A | 5/1997 | Klassen et al. | |
| 5,671,936 A | 9/1997 | Turner | |
| 5,678,837 A | 10/1997 | Leitner | |
| 5,685,553 A | 11/1997 | Wilcox et al. | |
| 5,791,674 A | 8/1998 | D'Aluisio et al. | |
| 5,816,356 A | 10/1998 | Jansson et al. | |
| 5,867,906 A | 2/1999 | Klassen | |
| 5,882,088 A * | 3/1999 | Yahata | 301/110.5 |
| 5,899,480 A | 5/1999 | Leitner | |
| 5,901,974 A | 5/1999 | Busby et al. | |
| 5,921,572 A | 7/1999 | Bard et al. | |
| 5,931,487 A | 8/1999 | Koppelberg et al. | |
| 5,957,473 A | 9/1999 | Lawwill | |
| 6,015,360 A | 1/2000 | Chang | |
| 6,036,213 A | 3/2000 | Busby | |
| 6,056,307 A | 5/2000 | Busby et al. | |
| 6,073,950 A | 6/2000 | Busby | |
| 6,076,845 A | 6/2000 | Lawwill et al. | |
| 6,099,010 A | 8/2000 | Busby | |
| 6,102,421 A | 8/2000 | Lawwill et al. | |
| 6,109,636 A | 8/2000 | Klein et al. | |
| 6,109,638 A | 8/2000 | Colegrove | |
| 6,131,934 A | 10/2000 | Sinclair | |
| 6,155,370 A | 12/2000 | Iwai et al. | |
| 6,161,858 A | 12/2000 | Tseng | |
| 6,162,140 A | 12/2000 | Fukuda | |
| 6,164,676 A | 12/2000 | Wilcox | |
| 6,170,845 B1 | 1/2001 | Tseng | |
| 6,199,886 B1 | 3/2001 | Guenther | |
| 6,203,042 B1 | 3/2001 | Wilcox | |
| 6,206,397 B1 | 3/2001 | Klassen et al. | |
| 6,237,706 B1 | 5/2001 | Karpik et al. | |
| 6,244,610 B1 | 6/2001 | Kramer-Massow | |
| 6,263,994 B1 | 7/2001 | Eitel | |
| 6,270,104 B1 | 8/2001 | Nelson et al. | |
| 6,277,463 B1 | 8/2001 | Hamilton et al. | |
| 6,286,642 B1 | 9/2001 | Yi | |
| 6,287,228 B1 | 9/2001 | Ichida | |
| 6,293,574 B1 | 9/2001 | Storck | |
| 6,293,883 B1 | 9/2001 | Ichida | |
| 6,309,028 B1 * | 10/2001 | Kanehisa et al. | 301/110.5 |
| 6,336,647 B1 | 1/2002 | Iwai et al. | |
| 6,352,314 B1 * | 3/2002 | Tabe | 301/110.5 |
| 6,354,669 B1 * | 3/2002 | Tabe | 301/110.5 |
| 6,361,059 B1 | 3/2002 | Ellsworth | |
| 6,378,885 B1 | 4/2002 | Ellsworth et al. | |
| 6,409,281 B1 * | 6/2002 | Kanehisa et al. | 301/110.5 |
| 6,439,593 B1 | 8/2002 | Tseng | |
| 6,450,520 B1 | 9/2002 | Girard | |
| 6,450,521 B1 | 9/2002 | Turner | |
| 6,471,230 B2 | 10/2002 | Ellsworth et al. | |
| 6,485,108 B1 * | 11/2002 | Tabe | 301/59 |
| 6,488,301 B2 | 12/2002 | Klassen et al. | |
| 6,581,711 B1 | 6/2003 | Tuluie | |
| 6,581,950 B1 | 6/2003 | Ellsworth | |
| 6,592,108 B1 | 7/2003 | Lude | |
| 6,595,538 B2 | 7/2003 | Ellsworth et al. | |
| 6,698,780 B2 | 3/2004 | Miyoshi | |
| 6,712,373 B2 | 3/2004 | Chamberlain et al. | |
| 6,712,374 B2 | 3/2004 | Assier | |
| 6,740,003 B2 | 5/2004 | Fukuda | |
| 6,823,958 B2 | 11/2004 | Domenicali et al. | |
| 6,843,494 B2 | 1/2005 | Lam | |
| 6,845,998 B2 | 1/2005 | Probst | |
| 6,854,753 B2 | 2/2005 | Turner | |
| 6,863,291 B2 | 3/2005 | Miyoshi | |
| 6,866,281 B2 | 3/2005 | Chamberlain et al. | |
| 6,877,591 B1 | 4/2005 | Hso | |
| 6,880,847 B2 | 4/2005 | Chamberlain et al. | |
| 6,886,846 B2 | 5/2005 | Carroll | |
| 6,924,021 B1 | 8/2005 | Colegrove et al. | |
| 6,926,298 B2 | 8/2005 | Ellsworth et al. | |
| 6,953,202 B2 | 10/2005 | Chamberlain et al. | |
| 6,955,373 B2 | 10/2005 | Chang | |
| 6,969,081 B2 | 11/2005 | Whyte | |
| 7,033,294 B2 | 4/2006 | Chamberlain et al. | |
| 7,044,874 B2 | 5/2006 | Shahana et al. | |
| 7,048,292 B2 | 5/2006 | Weagle | |
| 7,052,028 B2 | 5/2006 | Chamberlain | |
| 7,052,029 B2 | 5/2006 | Chamberlain | |
| 7,059,620 B2 | 6/2006 | Chamberlain et al. | |
| 7,066,556 B2 * | 6/2006 | Irie | 301/6.9 |
| RE39,159 E | 7/2006 | Klassen et al. | |
| 7,128,329 B2 | 10/2006 | Weagle | |
| 7,178,620 B2 | 2/2007 | Toyoda | |
| RE39,528 E * | 3/2007 | Kanehisa et al. | 301/110.5 |
| 7,216,883 B2 | 5/2007 | O'Connor | |
| 7,296,815 B2 | 11/2007 | Ellsworth et al. | |
| 7,350,797 B2 | 4/2008 | Carroll | |
| 7,392,999 B2 | 7/2008 | O'Connor | |
| 7,396,304 B2 | 7/2008 | Shahana | |
| 7,413,208 B2 | 8/2008 | Weng | |
| 7,467,803 B2 | 12/2008 | Buckley | |
| 7,494,146 B2 | 2/2009 | Tseng | |
| 7,581,743 B2 | 9/2009 | Graney | |
| 7,661,503 B2 | 2/2010 | Weagle | |
| 7,703,785 B2 | 4/2010 | Colegrove et al. | |
| 7,717,212 B2 | 5/2010 | Weagle | |
| 7,722,072 B2 | 5/2010 | Hoogendoorn | |
| 7,784,810 B2 | 8/2010 | Graney | |
| 7,828,314 B2 | 11/2010 | Weagle | |
| 7,837,213 B2 | 11/2010 | Colegrove et al. | |
| 8,002,301 B2 | 8/2011 | Weagle | |
| 8,235,409 B2 | 8/2012 | Colegrove et al. | |
| 2001/0024024 A1 | 9/2001 | Klassen et al. | |
| 2003/0038450 A1 | 2/2003 | Lam | |
| 2003/0090082 A1 | 5/2003 | Ellsworth et al. | |
| 2004/0116222 A1 | 6/2004 | Shahana et al. | |

(56) References Cited

U.S. PATENT DOCUMENTS

| | | | |
|---|---|---|---|
| 2005/0057018 | A1 | 3/2005 | Saiki |
| 2005/0067806 | A1 | 3/2005 | Weagle |
| 2005/0067810 | A1 | 3/2005 | Weagle |
| 2005/0285367 | A1 | 12/2005 | Chang et al. |
| 2006/0022429 | A1 | 2/2006 | Ellsworth et al. |
| 2006/0058135 | A1 | 3/2006 | Shahana |
| 2006/0061059 | A1 | 3/2006 | Lesage et al. |
| 2006/0071442 | A1 | 4/2006 | Hoogendoorn |
| 2006/0119070 | A1 | 6/2006 | Weagle |
| 2006/0181053 | A1 | 8/2006 | Huang et al. |
| 2006/0225942 | A1 | 10/2006 | Weagle |
| 2007/0024022 | A1 | 2/2007 | Weagle |
| 2007/0044210 | A1 | 3/2007 | Muller |
| 2007/0108725 | A1 | 5/2007 | Graney |
| 2007/0210555 | A1 | 9/2007 | O'Connor |
| 2007/0235986 | A1 | 10/2007 | Weagle |
| 2008/0067772 | A1 | 3/2008 | Weagle |
| 2008/0073868 | A1 | 3/2008 | Weagle |
| 2008/0252040 | A1 | 10/2008 | Colegrove et al. |
| 2008/0277900 | A1 | 11/2008 | I |
| 2009/0261556 | A1 | 10/2009 | Beale et al. |
| 2009/0261557 | A1 | 10/2009 | Beale et al. |
| 2010/0059965 | A1 | 3/2010 | Earle |
| 2010/0109282 | A1 | 5/2010 | Weagle |
| 2010/0207342 | A1 | 8/2010 | Weagle |
| 2011/0115181 | A1 | 5/2011 | Weagle |

FOREIGN PATENT DOCUMENTS

| | | |
|---|---|---|
| CA | 2601582 A1 | 10/2006 |
| DE | 3833880 A1 | 4/1990 |
| DE | 20217875 U1 | 6/2003 |
| DE | 20 2006 012023 U1 | 11/2006 |
| EP | 0538012 A1 | 4/1993 |
| EP | 0723907 B1 | 7/1998 |
| EP | 0912391 A1 | 5/1999 |
| EP | 0913322 A3 | 10/2000 |
| EP | 0941917 A3 | 11/2000 |
| EP | 1632429 A2 | 3/2006 |
| EP | 1747985 A2 | 1/2007 |
| EP | 1 982 911 A2 | 10/2008 |
| EP | 1663768 B1 | 3/2009 |
| EP | 1939084 B1 | 3/2010 |
| EP | 2025590 A3 | 2/2011 |
| EP | 2377751 A1 | 10/2011 |
| FR | 933079 | 12/1947 |
| FR | 2774966 | 8/1999 |
| GB | 772911 A | 4/1957 |
| GB | 1498168 | 1/2003 |
| WO | WO 95/29838 | 11/1995 |
| WO | WO 99/44880 A | 9/1999 |
| WO | WO 01/03958 A1 | 1/2001 |
| WO | WO 03018392 | 3/2003 |
| WO | WO 03037701 A1 | 5/2003 |
| WO | WO 2006/016195 A1 | 2/2006 |
| WO | WO 2006/032052 A2 | 3/2006 |
| WO | WO 2006/032052 A3 | 3/2006 |
| WO | WO 2008/027277 A2 | 3/2008 |

OTHER PUBLICATIONS

Fudge, Jack, Hexcel Research and Technology, "HexMC™ —Composites in 3D (A New High Performance Molding Compound," 2000 (13 pages).

"HexMC™ Moulding Compound" Product Data, 2000 (7 pages).

Hexcel Composite Materials "What is HexMC?" data sheets (7 pages).

http://www.ktm-bikes.at/2007/eu/detailBike.php?Bike=prowlerat1&kat=Dirt (1 page), 2007.

http://www.split-pivot.com/ (1 page), 2007.

WP Racing Importers of White Power Suspension (1 page).

Suzuki Launches Full-Floaters (2 pages), 1981.

http://ssp.cube-bikes.de/zoom07/zoom.html?stereo_black_1_detail_zoom (2 pages), 2007.

http://www.storck-bicycle.de/mbd/img/data_gallerie_77.jpg (1 page), 2007.

Partial European Search Report (Application No./Patent No. 08252589.0/2025590)—(7 pages), 2010.

Extended European Search Report dated Jan. 20, 2011; (EP Patent Application No. 08252589.0)—(11 pages), 2011.

Partial European Search Report (Application No. 07253508.1)—(5 pages), 2009.

*Split Pivot, Inc.*, Plaintiff, v. *Trek Bicycle Corporation*, Defendant, "Expert Witness Report of John C Cooper III Relating to Defendant's Invalidity Allegations and Its Expert Reports of Caulfield and Gibson", Jul. 25, 2013—(59) Pages.

John C. Cooper, III: *Split Pivot vs. Trek Bicycle*; "Videotaped Deposition of John C. Cooper, III": Nov. 26, 2013—(20) Pages.

2004 Nicolai Lambda bicycles, Nicolai at Interbike 2003, Pinkbike.com (Nov. 13, 2003), http://www.pinkbike.com/news/article1755.html.

2004 Nicolai Helius bicycles, Nicolai at Interbike 2003, Pinkbike.com (Nov. 13, 2003), http://www.pinkbike.com/news/article1755.html.

Aug. 9, 2013 Trek Bicycle Corporation's Proposed Findings of Fact in Support of Defendant's Motion for Summary Judgment—(4 pages).

Aug. 13, 2013 Exhibit A to Expert Report of Edward Caulfield, Ph.D. Regarding Noninfringement—(6 pages).

Aug. 13, 2013 Exhibit B to Expert Report of Edward Caulfield, Ph.D. Regarding Noninfringement—(8 pages).

Aug. 13, 2013 Exhibit C to Expert Report of Edward Caulfield, Ph.D. Regarding Noninfringernent—(8 pages).

Aug. 13, 2013 Exhibit J2 to Expert Report of Edward Caulfield, PhD. Regarding Invalidity—(11 pages).

Aug. 13, 2013 Exhibit J3 to Expert Report of Edward Caulfield, Ph.D. Regarding Invalidity—(9 pages).

Aug. 13, 2013 Exhibit K to Expert Report of Edward Caulfield, Ph.D. Regarding Invalidity—(35 pages).

Aug. 13, 2013 Exhibit L1 to Expert Report of Edward Caulfield, Ph.D. Regarding Invalidity—(5 pages).

Aug. 13, 2013 Exhibit L2 to Expert Report of Edward Caulfield, Ph.D. Regarding Invalidity—(15 pages).

Aug. 13, 2013 Exhibit L3 to Expert Report of Edward Caulfield, Ph.D Regarding Invalidity—(11 pages).

Aug. 13, 2013 Exhibit M to Expert Report of Edward Caulfield, Ph.D. Regarding Invalidity—(14 pages).

Aug. 13, 2013 Expert Report of Edward Caulfield, Ph.D. Regarding Noninfringement—(75 pages).

Aug. 13, 2013 Exhibit A to Expert Report of Edward Caulfield, Ph.D. Regarding Invalidity—(6 pages).

Aug. 13, 2013 Exhibit B to Expert Report of Edward Caulfield, Ph.D. Regarding Invalidity—(8 pages).

Aug. 13, 2013 Exhibit C to Expert Report of Edward Caulfield, Ph.D. Regarding Invalidity—(7 pages).

Aug. 13, 2013 Exhibit H1 to Expert Report of Edward Caulfield, Ph.D. Regarding Invalidity—(5 pages).

Aug. 13, 2013 Exhibit H2 to Expert Report of Edward Caulfield, Ph.D. Regarding Invalidity—(6 pages).

Aug. 13, 2013 Exhibit H3 to Expert Report of Edward Caulfield, Ph.D. Regarding Invalidity—(14 pages).

Aug. 13, 2013 Exhibit H4 to Expert Report of Edward Caulfield, Ph.D. Regarding Invalidity—(13 pages).

Aug. 13, 2013 Exhibit I1 to Expert Report of Edward Caulfield, Ph.D. Regarding Invalidity—(4 pages).

Aug. 13, 2013 Exhibit I2 to Expert Report of Edward Caulfield, Ph.D. Regarding Invalidity—(10 pages).

Aug. 13, 2013 Exhibit I3 to Expert Report of Edward Caulfield, Ph.D. Regarding Invalidity—(8 pages).

Aug. 13, 2013 Exhibit J1 to Expert Report of Edward Caulfield, Ph.D. Regarding Invalidity—(40 pages).

Aug. 13, 2013 Expert Report of Edward Caulfield, Ph.D. Regarding Invalidity—(219 pages).

Aug. 13, 2013 Exhibit A to Expert Report of Sherwood Gibson Regarding Invalidity—(3 pages).

Aug. 13, 2013 Exhibit B to Expert Report of Sherwood Gibson Regarding Invalidity—(4 pages).

(56) References Cited

OTHER PUBLICATIONS

Aug. 13, 2013 Exhibit C to Expert Report of Sherwood Gibson Regarding Invalidity—(7 pages).
Aug. 13, 2013 Exhibit D to Expert Report of Sherwood Gibson Regarding Invalidity—(13 pages).
Aug. 13, 2013 Exhibit E to Expert Report of Sherwood Gibson Regarding Invalidity—(54 pages).
Aug. 13, 2013 Exhibit F to Expert Report of Sherwood Gibson Regarding Invalidity—(9 pages).
Aug. 13, 2013 Expert Report of Sherwood Gibson Regarding Invalidity—(132 pages).

* cited by examiner

BICYCLE REAR WHEEL SUSPENSION SYSTEM

CROSS-REFERENCE TO RELATED APPLICATION

This application is a Continuation of U.S. application Ser. No. 12/901,893, filed Oct. 11, 2010, which is a Continuation of U.S. application Ser. No. 11/735,816, filed Apr. 16, 2007, now U.S. Pat. No. 7,837,213, all of which are incorporated herein by reference in their entirety. This application is also a Continuation of U.S. application Ser. No. 12/719,114, filed Mar. 8, 2010, which is a Divisional of U.S. application Ser. No. 11/839,931, filed Aug. 16, 2007, now U.S. Pat. No. 7,703,785, all of which are incorporated herein by reference in their entirety.

BACKGROUND OF THE INVENTION

The present invention relates generally to bicycles and, more particularly, to a suspension system for a rear wheel of the bicycle.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket, the bottom bracket usually comprising a cylindrical member for supporting the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from the top of the seat tube. The chain stays and seat stays are normally joined together with a rear dropout for supporting the rear axle of the rear wheel. The portion of the frame defined by the head tube, seat post and bottom bracket and the structural members that join those three items together can be referred to as the main front triangular portion of the frame, with the seat stays and chain stays defining a rear triangular portion of the frame. The foregoing description represents the construction of a conventional bicycle frame which of course does not possess a suspension having any shock absorbing characteristics.

The increased popularity in recent years of off-road cycling, particularly on mountains and cross-country, has made a shock absorbing system in many instances a biking necessity. A bicycle with a properly designed suspension system is capable of traveling over extremely bumpy, uneven terrain and up or down very steep inclines. Suspension bicycles are less punishing, reduce fatigue and reduce the likelihood of injury to the rider, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on conventional non-suspension bicycles. Over the last several years the number of bicycles now equipped with suspension systems has dramatically increased. In fact, many bicycles are now fully suspended, meaning that the bicycle has both a front suspension and a rear suspension. Front suspensions were the first to become popular. Designed to remove the pounding to the bicycle front end, the front suspension is simpler to implement than a rear suspension. A front suspension fork is easy to retrofit onto an older model bicycle. On the other hand, a rear suspension will increase traction and assist in cornering and balance the ride.

During cycling, as the bicycle moves along a desired path, discontinuities of the terrain are communicated to the assembly of the bicycle and ultimately to the rider. Although such discontinuities are generally negligible for cyclists operating on paved surfaces, riders venturing from the beaten path frequently encounter such terrain. With the proliferation of mountain biking, many riders seek the more treacherous trail. Technology has developed to assist such adventurous riders in conquering the road less traveled. Wheel suspension systems are one such feature.

Riding a fully suspended mountain bike along a rough, rock strewn trail, or even level riding on city and country roads, provides a new degree of safety and comfort to the rider. It is in downhill riding and racing that a rear suspension is most beneficial, but even on ordinary city and country roads, a rear suspension allows the rider to maintain a forward facing orientation to more safely view traffic and road conditions without paying disproportionate attention to stones and potholes immediately below in the rider's path. A number of pivoting "swing arm" suspensions have been developed for rear wheel suspensions on bicycles. In its simplest configuration, the chain stays, which on a conventional bicycle frame are rigidly mounted, are replaced by a pair of swing arms that are pivotably attached at their front ends to the generally fixed front triangular portion of the frame. The pivot is usually located near the bottom bracket where the pedal and crank are supported. The rear ends of the swing arms, which support the rear axle, move upward and downward in response to the rear wheel striking rocks, curbs and other obstructions. The range of movement of the swing arm usually is controlled by a shock absorber affixed between the swing arm and the main front frame. Although such systems have allowed riders to conquer more aggressive terrain, room for improvement still exists.

Many riders appreciate that braking on mountain bikes can feel "chattery", or as though the wheel is skipping over the terrain rather than rolling thereover. This chatter can detract from rider comfort and confidence as well as adversely affect bicycle performance. During normal operation, as the wheel moves across the ground, a contact patch of the tire is defined as the area of the tire that engages the ground surface. During translation of the suspension system relative to the frame, the contact patch rotates about the tire relative to an axis of rotation of the tire. Typically, the contact patch rotates 10 to 23 degrees for bikes having a suspension which travel ranging from about 122 to approximately 180 millimeters. Other suspension systems provide contact patch rotation in the range of 7 to 12 degrees for bicycles having 120 to 250 millimeters of suspension travel. Rotation of the contact patch contributes to the operational chatter perceived by the rider. Accordingly, it is desired to provide a suspension system having a reduced contact patch rotation.

Braking forces also affect operation of the suspension system. Braking forces can cause the suspension system to compress or extend based, in part, on the orientation of the brake system with respect to the movable links of the suspension and/or the fixed portion constructed to support the rider. Improper association of the brake system with the rear wheel and the movable members of the suspension system can detrimentally affect bicycle performance as well as stopping ability. During braking, rider momentum generates a forward weight shift which acts to compress the front suspension while extending the rear suspension. The extension of the rear suspension system un-weights the rear wheel and tends to reduce rear tire traction. The reduction in rear tire traction adversely affects braking power in that, if the rear tire traction is sufficiently reduced, the rear tire may be allowed to slide along the ground surface. Such an event can distract a rider and may adversely affect the rider's ability to maintain control of the bicycle. If the loss of rear tire traction during braking, or skid, is unanticipated by the rider, the rider may even crash. Accordingly, it is also desired to provide a suspension system that enhances the attitude of the bicycle during braking so as to provide at least partial compression of the suspension system through a majority of braking conditions.

BRIEF DESCRIPTION OF THE INVENTION

The present invention provides a frame assembly and suspension system that overcomes the aforementioned drawbacks. A frame according to a number of the aspects of the invention includes a number of interconnected rotatable members that are configured to absorb shocks and impacts associated with operation of the bicycle. The suspension system includes a chain stay and a seat stay pivotably connected to a frame constructed to support a rider. A rearward axis of rotation of the chain stay and the seat stay are generally concentrically orientated with respect to an axis of rotation of a rear wheel, i.e. a rear wheel axle. Such a construction provides a suspension system that is highly tunable as well as configured to maintain operation of the rear wheel braking system throughout a majority of the travel range of the rear wheel suspension system.

One aspect of the invention discloses a bicycle frame assembly having a frame for supporting a rider and a swing arm and seat stay movably connected to the frame. The swing arm has a first end that is pivotably connected to the frame and a second end for pivotably engaging a rear wheel assembly. The seat stay is pivotably connected to the rear wheel assembly such that the seat stay, the swing arm, and a rear wheel have a common axis of rotation. Such a construction functions to reduce the size of the contact patch of the rear wheel during operation.

A bicycle rear wheel suspension system according to another aspect of the invention is disclosed as having a number of interconnected links. A first link is pivotably connected to a frame member and has a first section that extends rearward of the frame member for supporting a wheel and a second section that extends forward of the frame member. A rocker arm is pivotably connected to the frame and has a first portion that extends rearward of the frame member and a second portion that extends forward of the frame member. A second link is pivotably disposed between the first section of the first link and the first portion of the rocker arm such that the first link can the second link can rotate about a common axis. The system includes an arrestor that has a first end connected to the second section of the first link and a second end connected to the second portion of the rocker arm. Accordingly, the arrestor is free-floating or not otherwise rigidly connected to the frame.

A further aspect of the invention discloses a bicycle frame having a first portion for supporting a rider and a number of interconnected pivotable members. An arm is pivotably attached to the first portion of the frame. A first member is pivotably attached to the first portion and has a first end and a second end. The first end of the first member is connected to the arm by an absorber. A second member also includes a first end and a second end. The first end is connected to an end of the arm generally opposite the absorber and the second end is pivotably connected to the second end of the first member such that the first and second members are rotatable about a common axis.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
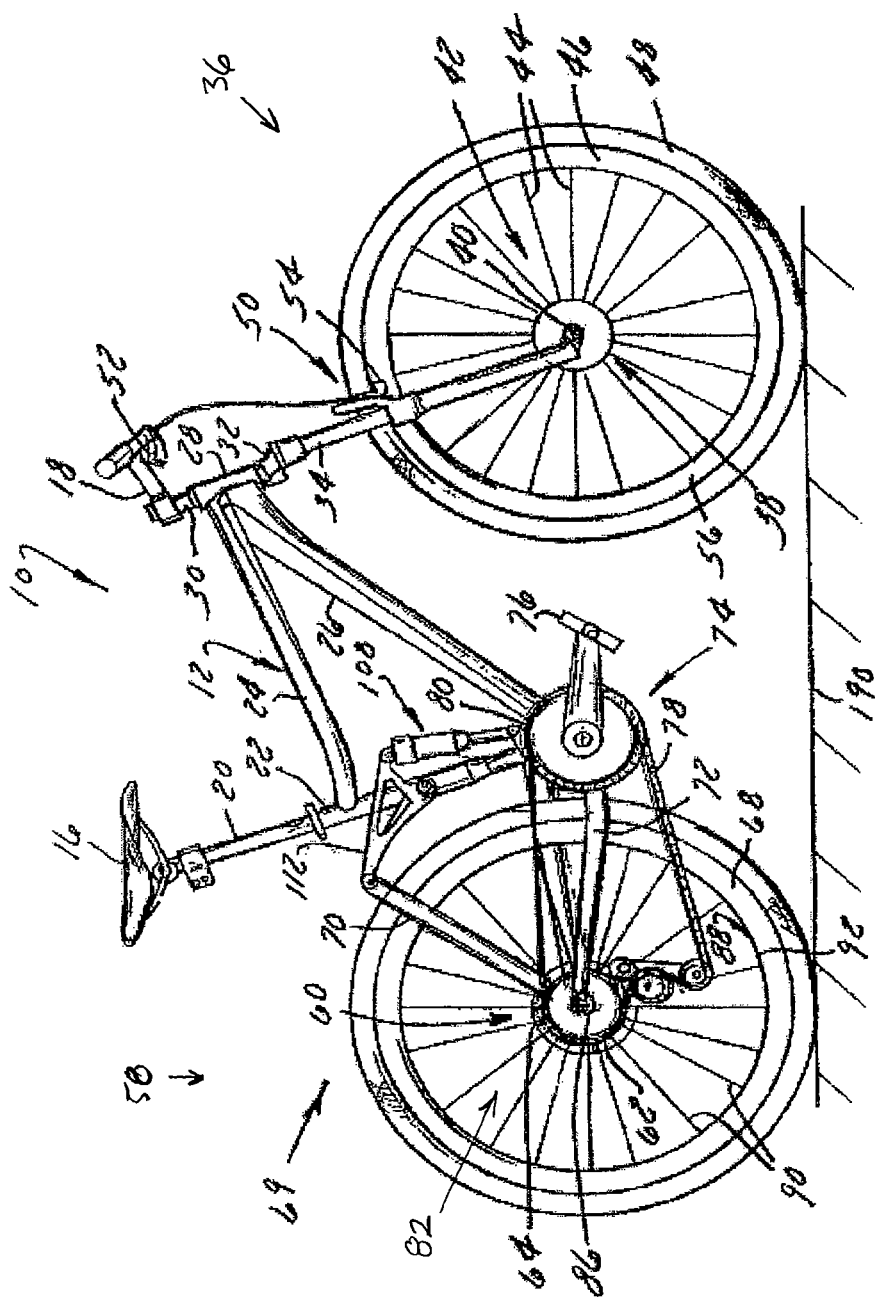
FIG. 1 is an elevational view of a bicycle equipped with a frame and suspension system according to the present invention.

FIG. 1 shows a bicycle 10 having a frame assembly 12 equipped with a rear wheel suspension system according to the present invention. Bicycle 10 includes a seat 16 and handlebars 18 that are attached to frame assembly 12. A seat post 20 is connected to seat 16 and slidably engages a seat tube 22 of frame assembly 12. A top tube 24 and a down tube 26 extend forwardly from seat tube 22 to a head tube 28 of frame assembly 12. Handlebars 18 are connected to a stem 30 that passes through head tube 28 and engages a fork crown 32. A pair of forks 34 extend from generally opposite ends of fork crown 32 and are constructed to support a front wheel assembly 36 at an end of each fork or a fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebars 18 and a pair of brake pads 54 positioned on generally opposite sides of front wheel assembly 36. Brake pads 54 are constructed to engage a brake wall 56 of rim 46 thereby providing a stopping or slowing force to front wheel assembly 36. A rear wheel assembly 58 includes a disc brake assembly 60 having a rotor 62 and a caliper 64 that are positioned proximate a rear axle 66. A rear wheel 68 is positioned generally concentrically about rear axle 66. Understandably, front wheel assembly 36 and rear wheel assembly 58 could be equipped with a brake assembly generally similar to front brake assembly 50 or disc brake assembly 60.

A rear wheel suspension system 69 is pivotably connected to frame 12 to allow rear wheel 68 to move independent of seat 16 and handlebars 18. Suspension system 69 includes a seat stay 70 and a chain stay 72 that offset rear axle 66 from a crankset 74. Crankset 74 includes a pedal 76 that is operationally connected to a chain 78 via a chain ring or sprocket 80. Rotation of chain 78 communicates a drive force to a rear section 82 of bicycle 10. A gear cluster 84 is positioned at rear section 82 and engaged by chain 78. Gear cluster 84 is generally concentrically orientated with respect to rear axle 66 and includes a number of variable diameter gears. Gear cluster 84 is operationally connected to a hub 86 of a rear wheel 88 of rear wheel assembly 58. A number of spokes 90 extend radially between hub 86 and a rim 92 of rear wheel 88. As is commonly understood, rider operation of pedals 76 drives chain 78 thereby driving rear wheel 88 which in turn propels bicycle 10.

Figure 2:
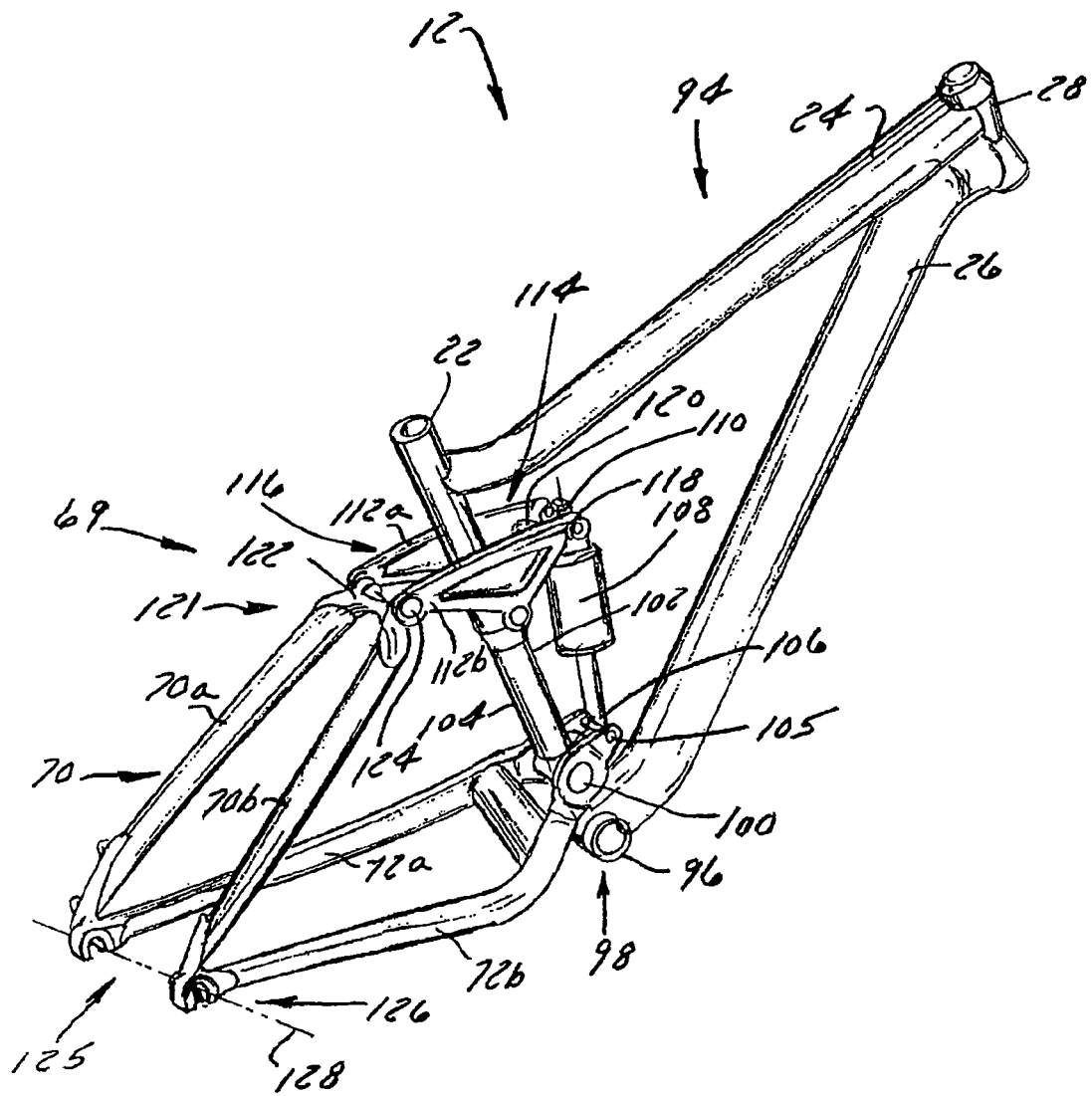
FIG. 2 is a perspective view of the frame assembly shown in FIG. 1.

As shown in FIG. 2, frame assembly 12 includes a first portion 94 that generally includes seat tube 22, top tube 24, down tube 26, and head tube 28. A bottom bracket 96 is formed proximate the interface of seat tube 22 and down tube 26 and is constructed to operatively connect crankset 74 to bicycle frame assembly 12. A first end 98 of chain stay 72 is pivotably connected to seat tube 22 proximate bottom bracket 96. A pivot pin 100 passes through seat tube 22 generally between a forward edge 102 and a rearward edge 104 of seat tube 22. Pivot pin 100 pivotably connects alternate side chain stays 72a, 72b to seat tube 22. A portion 105 of chain stays 72a, 72b extends forward of seat tube 22 and is constructed to engage a first end 106 of an absorber, or shock absorber 108. A second end 110 of shock absorber 108 is pivotably connected to a rocker arm 112 that is pivotably connected to seat tube 22. Preferably, shock absorber 108 is a gas shock absorber configured to contain a compressed volume of gas. Other absorber constructions, such as a spring-based absorber or a fluid-based shock absorber are envisioned and within the scope of the claims.

Rocker arm 112 includes a first portion 114 that extends forward of seat tube 22 and a second portion 116 that extends rearwardly from seat tube 22. A pivot pin 118 secures rocker arm 112 to seat tube 22 and a web wall 120 extends between generally opposite sides 112a, 112b of rocker arm 112 such that opposite sides 112a, 112b of rocker arm 112 generally flank seat tube 22. Second portion 116 of rocker arm 112 extends rearward from seat tube 22 and is pivotably connected to a first end 121 of seat stay 70. Seat stay 70 includes generally opposite sides 70a, 70b that are connected at first end 121 by a bracket 122. A pivot pin 124 pivotably connects second portion 116 of rocker arm 112 to first end 121 of seat stays 70a, 70b.

A second end 125 of seat stays 70a, 70b is pivotably connected to a second end 126 of chain stays 72a, 72b. An axis of rotation between seat stays 70a, 70b and chain stays 72a, 72b, indicated by line 128, is generally concentrically oriented to rear axle 66. That is, rear axle 66, seat stays 70a, 70b, and chain stays 72a, 72b are connected to be rotatable about a common axis, i.e. axis 128.

Figure 3:
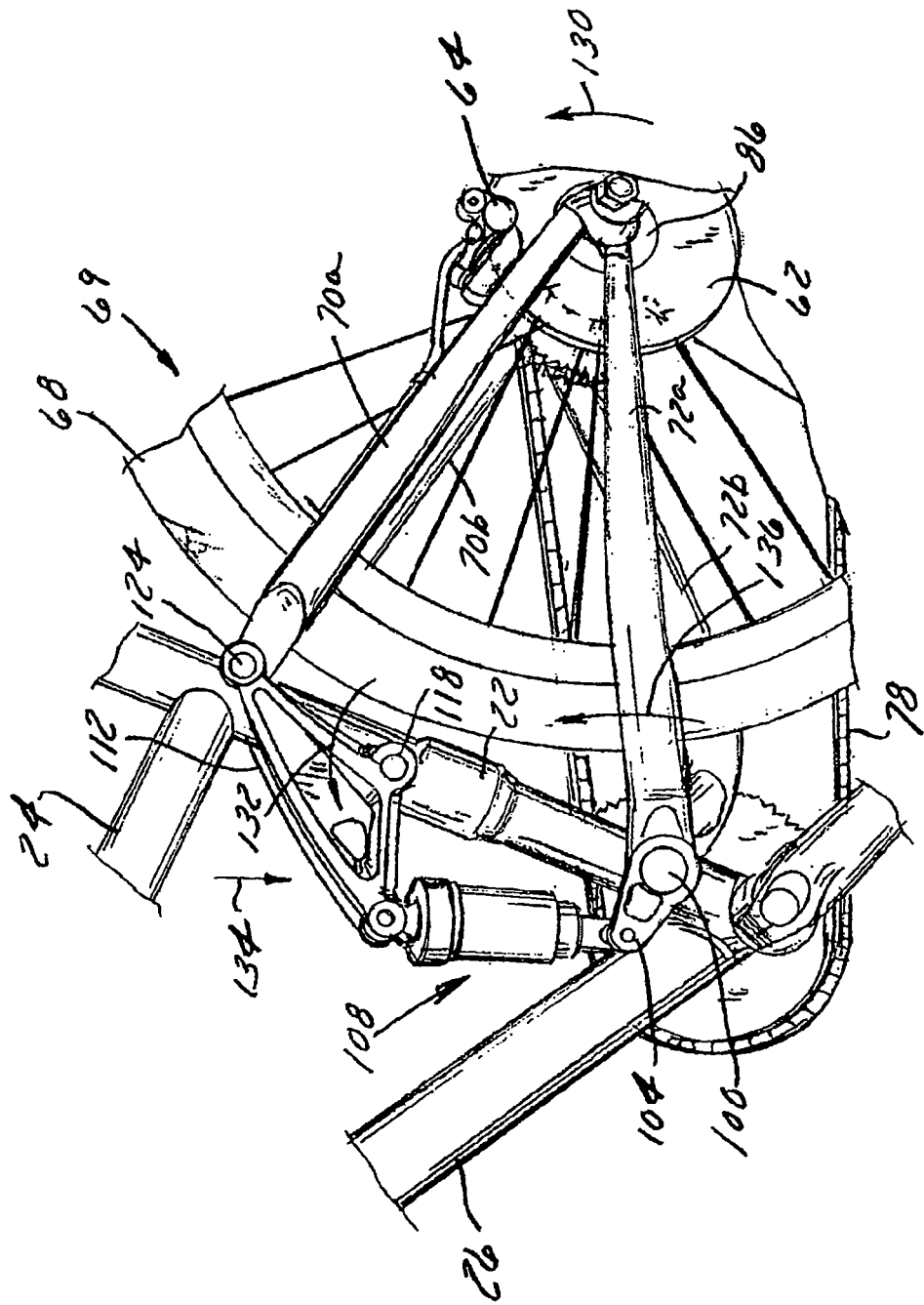
FIG. 3 is an elevational view of a portion of the bicycle shown in FIG. 1 with the suspension system in a compressed position.
Figure 4:
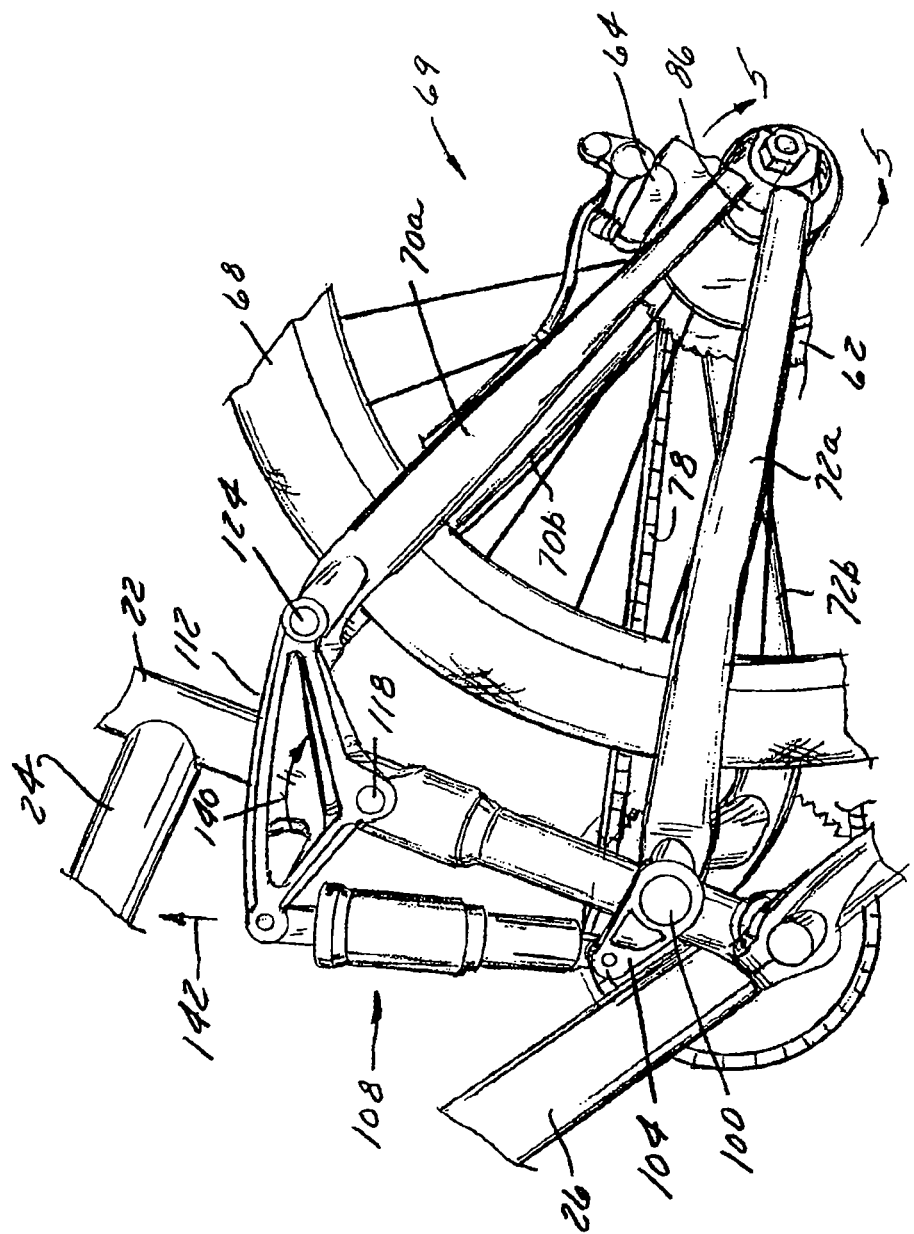
FIG. 4 is a view similar that shown in FIG. 3 with the suspension system in an extended position.

As shown in FIGS. 3 and 4, in addition to the relative rotation between seat stays 70a, 70b and chain stays 72a, 72b, seat stays 70a, 70b are also rotatable relative to rocker arm 112 about pivot pin 124. Chain stays 72a, 72b are also rotatable relative to seat tube 22 about pivot pin 100. As shown in FIG. 3, when subjected to an impact, that portion of suspension system 69 rearward of seat tube 22 rotates generally upward, indicated by arrow 130. This action rotates rocker arm 112 about pivot pin 118 in the direction indicated by arrow 132 thereby subjecting shock absorber 108 to a compressive force, indicated by arrow 134. During this same movement of rocker arm 112, chain stays 72a, 72b rotate in the direction indicated by arrow 136 about pivot pin 100. This action displaces forward portion 105 of chain stays 72a, 72b in the same direction as force 134 thereby allowing a portion of force 134 to be absorbed by the mechanical association of seat stays 70a, 70b and chain stays 72a, 72b.

As shown in FIG. 4, when rear wheel 68 overcomes an obstacle or other impact, suspension system 69 returns to a generally unloaded orientation such that there is a collective rotation of rocker arm 112, seat stays 70, and chain stays 72 in the direction, indicated by arrow 140. Rotation 140 is associated with the restoring force, indicated by arrow 142, generated by shock absorber 108.

Still referring to FIGS. 3 and 4, rotor 62 of brake assembly 60 is attached to hub 86 of rear wheel 68. Actuation of caliper 64 engages the pads of caliper 64 with rotor 62 thereby imparting a stopping force to wheel 68. Caliper 64 is fixedly connected to seat stay 70 such that, during a breaking operation, suspension system 69 is allowed to move in a primarily upward direction rather than a rearward direction. Such a configuration allows suspension system 69 to maintain the attitude of bicycle 10 during a braking operation by limiting the compression of shock absorber 108 by maintaining the weighting of rear wheel 68.

Figure 5:
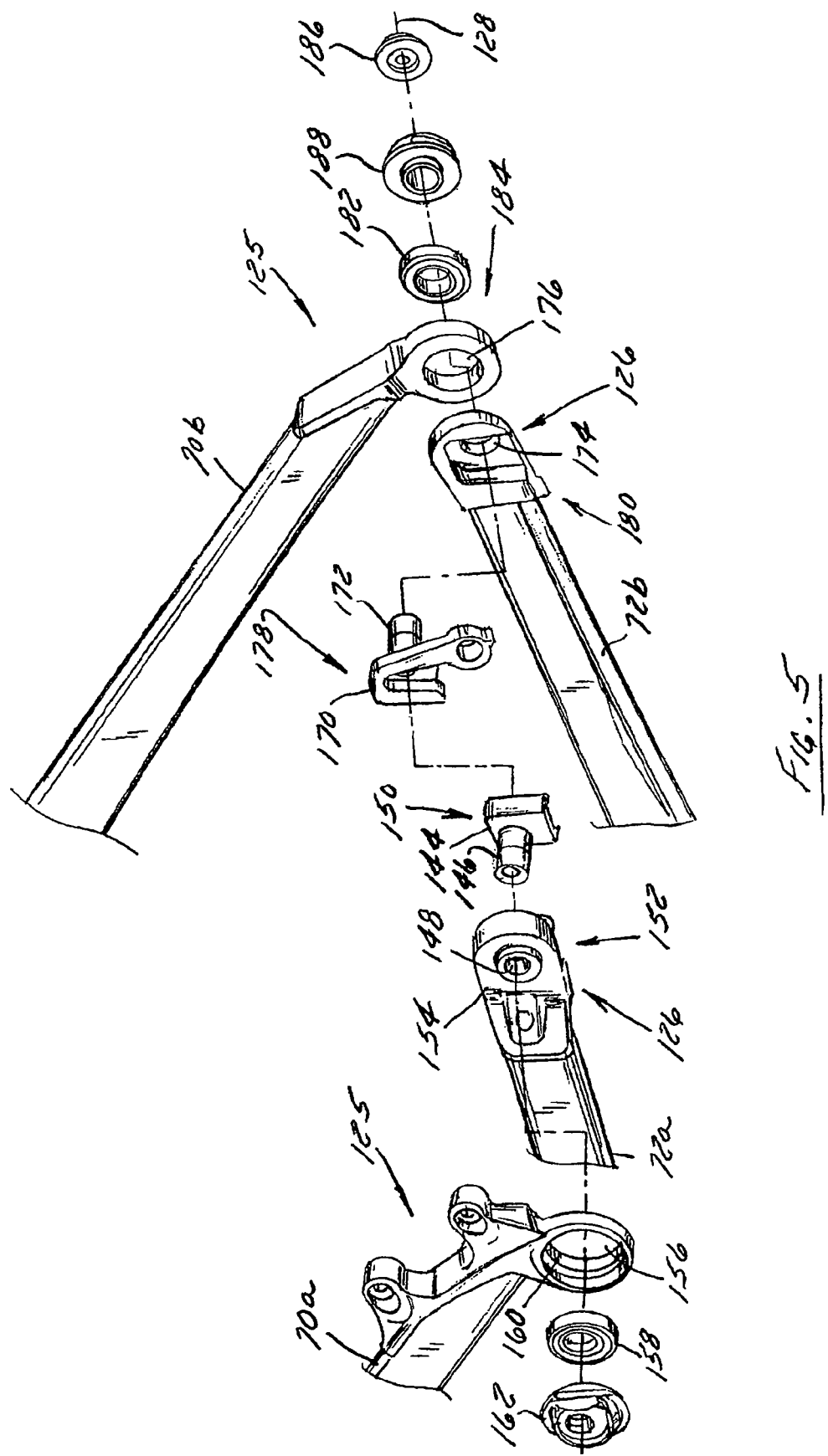
FIG. 5 is an exploded view of a rear portion of the suspension system generally along line 5-5 shown in FIG. 4.

FIG. 5 shows an exploded view of the assembly of the coaxial connection of seat stays 70a, 70b and chain stays 72a, 72b. A first insert 144 includes a stem 146 that is constructed to pass into an opening 148 formed in second end 126 of chain stay 72a. Insert 144 includes a contour 150 that is constructed to generally correspond to a contour 152 formed in second end 126 of chain stay 72a proximate opening 148. A lip 154 is formed about opening 148 and extends from a side of chain stay 72a generally opposite insert 144. Lip 154 is constructed to generally align opening 148 of chain stay 72a and an opening 156 formed in second end 125 of seat stay 70a. Such a construction ensures the generally concentric and coaxial alignment of chain stay 72a and seat stay 70a with axis of rotation 128. Second end 125 of seat stay 70a is constructed to receive a bearing 158 within a cavity 160 formed in second end 125. An end cap 162 engages axle 66 so as to secure bearing 158 in cavity 160. Bearing 158 and opening 148 of chain stay 72a are constructed to engage stem 146 of insert 144 such that chain stay 72a and seat stay 70a a rotate independently about axis 128. Such a construction allows for independent and coaxial rotation of seat stay 70a and chain stay 72a relative to axis 128. Similarly, a second insert 170 includes a stem 172 that is constructed to pass through an opening 174 formed in chain stay 72b and an opening 176 formed in seat stay 70b. Insert 170 includes a contour 178 that generally corresponds to a contour 180 of second end 126 of chain stay 72b. Such a mating orientation prevents rotation of second insert 170 relative to chain stay 72b. A bearing 182 engages a cavity 184 formed in second end 125 of seat stay 70b and engages stem 172 of insert 170. An end cap 186 and a spacer 188 are positioned proximate bearing 182 and configured to engage stem 172 of insert 170. Spacer 188 is constructed to generally enclose bearing 182 within cavity 184 and prevents dirt or other debris from fouling bearing 182.

When fully assembled, rear wheel assembly 58 is constructed to be received between insert 144 and insert 170.

Rear wheel assembly 58 is rotatably supported by an axle whose axis of rotation is coincident with axis 128. It is further appreciated that the axis 128 forms an axis of rotation of rear wheel assembly 58, seat stays 70a, 70b, and chain stays 72a, 72b, through the range of motion of the moveable members of rear suspension system 69.

Figure 6:
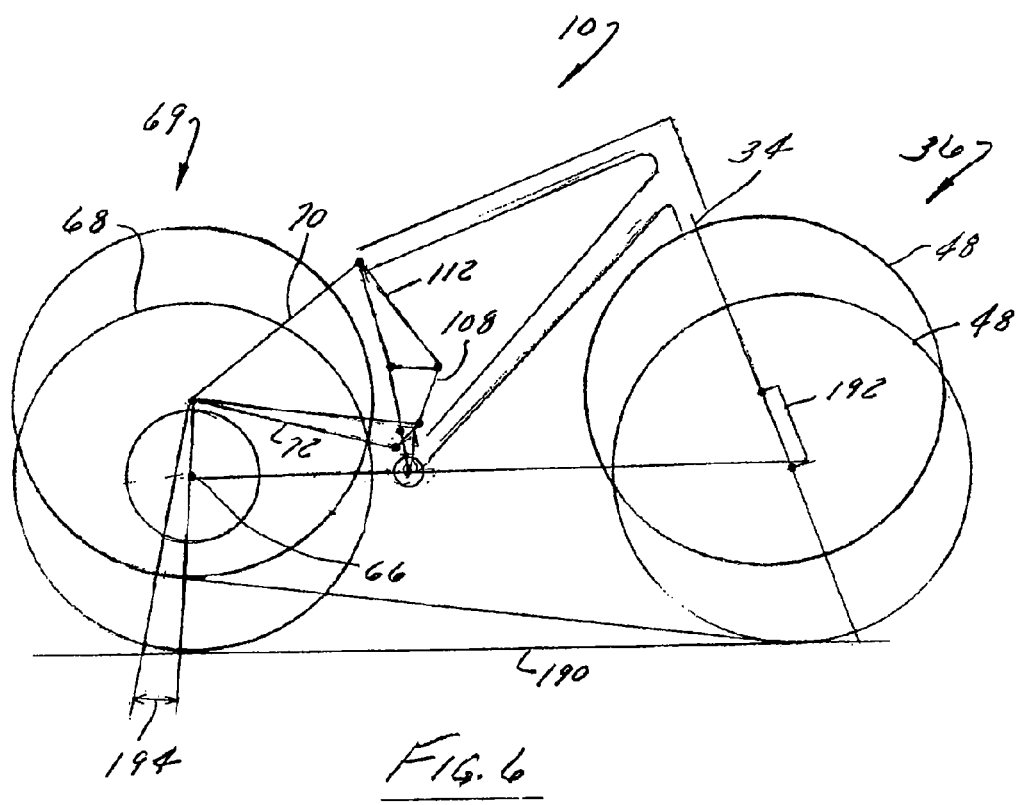
FIG. 6 is a geometric representation of the frame assembly shown in FIG. 2.

FIG. 6 shows a geometrical representation of the operation of suspension system 69. As shown in FIG. 5, as bicycle 10 traverses terrain, indicated by line 190 a shock absorber 192 of front fork 34 absorbs impacts experienced by front wheel assembly 36 thereby allowing the front tire 48 to deflect over the obstruction. A large portion of the shock or impact experienced by rear wheel 68 is absorbed by the collective operation and movement of seat stays 70, chain stays 72, rocker arm 112, and shock absorber 108. Wheel 68 has a normal operation contact patch 194 that is generally centrally positioned beneath the axis of rotation of axle 66. During braking, the concentric orientation of the pivot axis of seat stays 70 relative to chain stays 72 provides for both the substantially vertical translation of axle 66 and a substantially reduced range of translation of contact patch 194 through the movable range of suspension system 69. Preferably, contact patch 194 translates from about 0 to about 7 degrees for a suspension system having about 75 mm to about 250 mm of translation. Understandably, other ranges of contact patch rotation and suspension system travel are envisioned. Accordingly, suspension system 69 provides enhanced operation of the braking system throughout the travel range of the suspension system thereby providing a bicycle that is responsive to the dynamic riding conditions as well as enjoyable to ride.

A bicycle frame assembly according to a combination of aspects of the invention includes a number of rotatable members configured to absorb shocks and impacts associated with operation of the bicycle. The assembly includes a frame constructed to support a rider and a chain stay having a rearward end that extends toward a wheel hub and a forward end that is pivotably connected to the frame. An absorber is pivotably connected to the forward end of the chain stay and extends to a rocker arm that is pivotably connected to the frame. A seat stay is pivotably connected to a rearward end of the rocker arm and extends to the rearward end of the chain stay. The rearward ends of the seat stay and the chain stay are pivotably connected to rotate about a common axis. Such a construction provides a bicycle suspension system that has an absorbing member that is not rigidly connected to a fixed frame member as well as a suspension system with enhanced operation throughout a range of operating positions of the members of the suspension system. The suspension system maintains a reduced contact patch of the rear wheel over the range of motion of the suspension system thereby enhancing operation of the bicycle.

Therefore, one embodiment of the invention includes a bicycle frame assembly having a frame for supporting a rider, a swing arm, and a seat stay. The swing arm has a first end that is pivotably connected to the frame and a second end for pivotably engaging a rear wheel assembly. The seat stay is pivotably connected to the rear wheel assembly such that the seat stay, the swing arm, and a rear wheel have a common axis of rotation.

A bicycle rear wheel suspension system according to another embodiment of the invention includes a number of interconnected links. A first link is pivotably connected to a frame member and has a first section that extends rearward of the frame member for supporting a wheel and a second section that extends forward of the frame member. A rocker arm is pivotably connected to the frame and has a first portion that extends rearward of the frame member and a second portion that extends forward of the frame member. A second link is disposed between the first section of the first link and the first portion of the rocker arm such that the first link and the second link are pivotable about a common axis. The system includes an arrestor that has a first end connected to the second section of the first link and a second end connected to the second portion of the rocker arm.

A further embodiment of the invention includes a bicycle frame having a first portion for supporting a rider and a number of interconnected pivotable members. An arm is pivotably attached to the first portion of the frame. A first member is pivotably attached to the first portion and has a first end and a second end. The first end of the first member is connected to the arm by an absorber. A second member also includes a first end and a second end. The first end is connected to an end of the arm generally opposite the absorber and the second end is pivotably connected to the second end of the first member such that the first and second members are rotatable about a common axis.

The present invention has been described in terms of the preferred embodiment, and it is recognized that equivalents, alternatives, and modifications, aside from those expressly stated, are possible and within the scope of the appending claims.

What is claimed is:

1. A bicycle including a front wheel and a rear wheel, comprising:
    a bicycle frame;
    a first member coupled to the bicycle frame at a first pivot axis;
    a second member coupled to the bicycle frame at a second pivot axis; and
    a third member coupled to the second member at a third pivot axis and pivotable relative to the first member at a fourth pivot axis;
    wherein:
        the first member, the second member, and the third member are configured such that a contact patch of the rear wheel has a translation range of 0 degrees to about 7 degrees;
        the first member includes an insert at the fourth pivot axis;
        a portion of the insert is mated to an opening of the first member defined by a first contour that opens to a ground-facing side of the first member;
        the third member is configured to rotate around a stem of the insert; and
        the insert includes a vertical pocket configured to cradle a hub end of the rear wheel.

2. The bicycle of claim 1, further comprising a shock absorber coupled to the second member.

3. The bicycle of claim 2, wherein the shock absorber comprises at least one of a spring, a gas charge, and a fluid.

4. The bicycle of claim 2, wherein the shock absorber is coupled to the first member at a fifth pivot axis.

5. The bicycle of claim 4, wherein the first pivot axis, a rear wheel axis, and the fifth pivot axis form a triangle.

6. The bicycle of claim 2, wherein the shock absorber is coupled to the bicycle frame at a fifth pivot axis.

7. The bicycle of claim 1, wherein the first member, the second member, and the third member are configured such that the rear wheel has a vertical translation range of 0 mm to about 250 mm while the contact patch of the rear wheel has the translation range of 0 degrees to about 7 degrees.

8. The bicycle of claim 1, wherein the first member is configured to straddle the rear wheel, and the rear wheel is coupled to the third member and the first member at a rear wheel axis of the rear wheel.

9. The bicycle of claim 1, wherein the third member is configured to straddle the rear wheel, and the rear wheel is coupled to the third member and the first member at a rear wheel axis of the rear wheel.

10. The bicycle of claim 1, further comprising a brake caliper coupled to the third member and a rotor associated with the rear wheel.

11. The bicycle of claim 1, further comprising a rear axle associated with the rear wheel, wherein:
    the insert is configured to support the rear axle;
    the vertical pocket of the insert is configured to align the rear wheel with an axle opening of the insert;
    the vertical pocket of the insert is configured to allow the rear wheel to drop out when the rear axle is removed;
    the stem is configured to support an inner race of a bearing; and
    the third member is fixedly coupled to an outer race of the bearing.

12. The bicycle of claim 11, wherein the vertical pocket is located around the axle opening and extends to the ground-facing side of the one of the second member or the third member.

13. The bicycle of claim 12, wherein the vertical pocket tapers from the ground-facing side to the portion located around the axle opening.

14. The bicycle of claim 1, further comprising a rear axle associated with the rear wheel, wherein the first member is pivoted with the third member.

15. The bicycle of claim 1, further comprising a derailleur pivotable about a rear wheel axis of the rear wheel.

16. The bicycle of claim 1, wherein the third member is pivotable relative to the first member at a rear wheel axis of the rear wheel.

17. An apparatus, comprising:
    a bicycle frame;
    a chain stay structure coupled to the bicycle frame at a first rotation point;
    at least one seat stay element configured to rotate relative to the chain stay structure at a rear wheel axis;
    an insert removably secured in an opening of the chain stay structure;
    a brake coupled to the at least one seat stay element; and
    a rotor concentric with a rear wheel axis;
    wherein:
        the at least one seat stay element is linked to the bicycle frame such that the rotor has a translation range of 0 degrees to about 7 degrees during a translation of the rear wheel axis;
        the at least one seat stay element rotates about a stem of the insert; and
        the insert includes a vertical tapered pocket configured to support a rear wheel hub.

18. The apparatus of claim 17, further comprising a shock absorber linked to the at least one seat stay element and the bicycle frame, wherein the brake comprises a caliper adapted to the rotor.

19. The apparatus of claim 18, wherein the shock absorber is coupled to the chain stay structure at a second pivot point.

20. The apparatus of claim 18, wherein the shock absorber is coupled to the bicycle frame at a second pivot point.

21. The apparatus of claim 17, further comprising a rear axle at the rear wheel axis, wherein the rear axle is pivotably coupled to the chain stay structure and the at least one seat stay element.

22. The apparatus of claim 21, wherein the rear axle comprises a quick-release skewer.

23. The apparatus of claim 17, further comprising a rear axle wherein the insert comprises a hole for the rear axle.

24. The apparatus of claim 23, wherein:
    the pocket of the insert is configured to align the rear wheel hub with the hole of the insert;
    the rear axle is configured to be inserted through rear wheel hub and the hole; and
    the pocket of the insert is configured to allow the rear wheel hub to drop out when the rear axle is removed.

25. The apparatus of claim 17, wherein the chain stay structure and the at least one seat stay element linked to the bicycle frame are configured such that the rear wheel axis has a vertical translation range of 0 mm to about 250 mm while the rotor has a translation range of 0 degrees to about 7 degrees during a translation of the rear wheel axis.

* * * * *